US006898979B2

(12) United States Patent
Cowan et al.

(10) Patent No.: US 6,898,979 B2
(45) Date of Patent: May 31, 2005

(54) AUTOMOBILE AIR CONDITIONING SYSTEM HAND HELD PRESSURE MEASURING DEVICE

(75) Inventors: David M. Cowan, Brooklyn, NY (US); Jochen Schäpers, New York, NY (US); Saul Trachtenberg, New York, NY (US)

(73) Assignee: Interdynamics, Inc., Tarrytown, NY (US)

( * ) Notice: Subject to any disclaimer, the term of this patent is extended or adjusted under 35 U.S.C. 154(b) by 37 days.

(21) Appl. No.: 10/644,699

(22) Filed: Aug. 19, 2003

(65) Prior Publication Data

US 2005/0039536 A1 Feb. 24, 2005

(51) Int. Cl.[7] .................................................. G01L 7/10
(52) U.S. Cl. ............................. 73/732; 73/753; 73/756
(58) Field of Search .................................. 73/700–756

(56) References Cited

U.S. PATENT DOCUMENTS

| | | | | |
|---|---|---|---|---|
| 4,320,767 A | * | 3/1982 | Villa-Real ................... | 600/493 |
| 5,174,384 A | * | 12/1992 | Herman ........................ | 169/70 |
| 5,329,975 A | * | 7/1994 | Heitel ........................... | 141/19 |
| 6,230,549 B1 | * | 5/2001 | Harris .......................... | 73/49.7 |
| 6,445,287 B1 | * | 9/2002 | Schofield et al. ........... | 340/442 |

* cited by examiner

Primary Examiner—Edward Lefkowitz
Assistant Examiner—Jermaine Jenkins
(74) Attorney, Agent, or Firm—Levisohn, Berger & Langsam, LLP

(57) ABSTRACT

A portable hand-held device for measuring the pressure in an automobile air conditioning system includes a socket adapted to connect to a service port, an internal passage in communication with the socket, and a pressure gauge disposed in the housing selectively in communication with the internal passage. A valve is interposed between the internal passage and the gauge. When the socket is engaged to a service port of an automobile air conditioning system, gas from the automobile air conditioning system enters the socket, passes through the internal passage, and is read by the pressure gauge. A button is provided having a ramped portion, and a pin contacts the ramped portion of the button at one end at the valve at the other end. When the button is depressed, the pin raises the valve into an open position to allow pressurized gas trapped on a gauge side of the valve to be released via the socket to reset the gauge.

8 Claims, 6 Drawing Sheets

AUTOMOBILE AIR CONDITIONING SYSTEM HAND HELD PRESSURE MEASURING DEVICE

BACKGROUND OF THE INVENTION

1. Field of the Invention

The invention relates to pressure measuring devices in general and more specifically to pressure measuring devices for use in reading the pressure of automotive systems such as automobile air conditioning systems.

2. Description of Related Art

Automobile air conditioners use gaseous chemicals called refrigerants to cool air. In accordance with Gay-Lussac's Law, which is:

$$P/T = P'/T' \text{ where V is constant} \quad (1)$$

and where P=pressure, T=temperature, V=volume, as the pressure of a compressed gas increases, its temperature increases. Similarly, as the pressure of the gas decreases, the temperature of the gas decreases. In this manner, gas is compressed and then expanded, and air is blown over that portion of the system in which the gas is expanded, and thus the blown air is cooled. Such is the basic concept of most refrigeration and air conditioning systems.

Since the pressure of the refrigerant plays an integral part of how efficiently an air conditioning system functions (or if it functions at all), it is desirable to be able to check the pressure of the refrigerant in the air conditioning system to insure that sufficient refrigerant is present. If the system pressure is too low, there will not be sufficient gas to compress and then expand, and the resultant change in temperature will be decreased; the air blown over the cooled portion of the system will, in turn, not be cooled sufficiently. Because the system is subject to significant swings in temperature and frequent thermal cycling—owing both to the action of the air conditioner as well as from the heat of the engine,—joints have a tendency to expand and contract, and refrigerant can slowly leak out of a system over time. One must keep a vigilant eye on the refrigerant level in one's automobile air conditioner.

Typical automotive air conditioners are provided with a service port to allow for the addition of refrigerant and other chemicals as well as to allow a qualified mechanic to check the level of the refrigerant in the system. For example, as shown schematically in FIG. 5A, a professional mechanic would likely use a manifold set 200, having a low pressure gauge 210 coupled to port 212 and a high pressure gauge 220 coupled to port 214. Hose 230 is attached to port 212 at one end and to the low pressure service port 250 via connector 240 at the other end. This device is large, heavy, and expensive, and it is really only suitable for the professional mechanic.

There are, of course, many automobile owners who choose to perform routine maintenance on their vehicles themselves. This market is commonly referred to as the "do-it-yourself" market, for self-evident reasons. A number of products have been developed by the assignee of the instant invention that allow the do-it-yourselfer to perform maintenance on an automobile air conditioner safely and easily. Some examples are described in U.S. Pat. No. 6,089,032; U.S. Pat. No. 6,446,453; and U.S. Pat. No. 6,467,283, all to Trachtenberg, the teachings of which are all herein incorporated by reference. These products include methods and kits for changing an air conditioning system over from using R-12 to R134a and a kit for servicing an air conditioning system.

The servicing kit of U.S. Pat. No. 6,446,453 includes a unitary hose connection for servicing an automobile air conditioning system and is shown schematically in FIG. 5B. A first connector 316 is disposed at one end of hose 314 and is connectable with a low pressure service port 250 of an automobile air conditioning system, and a second connector 312 is disposed at the other end of hose 314 and is selectively connectable with both a pressure gauge 310 and a can tap valve (not shown). The can tap valve is attachable to a can of compressed refrigerant. When pressure gauge 310 is attached to second connector 312 and first connector 316 is attached to service port 250, the pressure of the refrigerant in the automobile air conditioning system can be measured. When the second connector is attached to the can tap valve, the compressed refrigerant in the can may be introduced into the automobile air conditioning system to thereby service the system. The hose connection, pressure gauge, can tap valve, and can of refrigerant may be packaged together in a kit.

While the above-described servicing system is quite useful for servicing an automobile air conditioner, it is still a little cumbersome to use if one only seeks to measure the pressure in the system. First, the pressure can only be read while the hose is connected to the service port; once the hose is removed, the pressurized gas leaves the hose and the gauge returns to zero. As a result, if one has trouble getting close enough to the pressure gauge in situ, one will be unable to remove the gauge and read the pressure. Second, removing the hose from the port will cause the pressurized gas to shoot out of the hose in whatever direction the hose is pointing at the time; the possibility exists for refrigerant and the associated oil to be sprayed onto the user's skin or in his eyes, in certain circumstances. If a user is not careful when using the servicing kit and removes the pressure gauge while the hose is still attached to the service port (or if the user attaches the hose to the service port without first attaching the pressure gauge), the refrigerant and oil will come shooting out of the system via the hose, invariably in the direction of the user. Thus, the servicing kit described is not quite "idiot-proof."

There is a need for a pressure gauge to allow a typical consumer to measure the pressure in his automobile air conditioner easily and safely.

SUMMARY OF THE INVENTION

It is an object of the invention to provide a simple and easy-to-use device for the do-it-yourself mechanic to check the refrigerant level of his automobile air conditioner.

It is another object of the invention to provide a device for checking the refrigerant level of a automobile air conditioner which necessarily vents trapped refrigerant away from the user.

It is another object of the invention to provide a device for checking the refrigerant level of a automobile air conditioner which can be read after being disconnected from the air conditioner.

It is another object of the invention to provide a device for checking the refrigerant level of a automobile air conditioner which cannot accidentally release the contents of the air conditioner.

It is another object of the invention to provide a device for checking the refrigerant level of a automobile air conditioner which requires a minimum of refrigerant to produce a reading.

The above and other objects are fulfilled by the invention, which is a portable device for measuring the refrigerant level in an automobile air conditioning system by measuring the pressure of same. The device is provided with a hand-held housing having a socket adapted to connect to a service port of an automobile air conditioning system and an internal passage in communication with the socket. A pressure gauge is disposed in the housing and selectively in communication with the internal passage. A valve or seal is interposed between the internal passage and the gauge. The seal is biased into a closed position sealing off the internal passage from the pressure gauge. When the socket is engaged to a service port of an automobile air conditioning system, gas from the automobile air conditioning system enters the socket, passes through the internal passage, and is read by the pressure gauge.

Reciprocatable means for opening the seal against the seal bias are preferably provided, including a button having a first end protruding from the hand-held housing and a second end having a ramped portion; the button is biased to protrude from the hand-held housing. A seal unseating pin has a first end in contact with the ramped portion of the button and a second end in contact with the seal. When the button is depressed, the first end of the pin rides up the ramped portion and the second end raises the seal into an open position to allow pressurized gas trapped on a gauge side of the seal to be released via the socket to reset the gauge.

DETAILED DESCRIPTION OF THE PREFERRED EMBODIMENT AND THE DRAWINGS

The preferred embodiment of the invention is a hand-held pressure measuring device with a pistol-style grip that can operated with one hand. The user pushes the socket of the measuring device onto the service port of the air conditioner until a pressure reading is made; usually less than a second of pushing is needed. The user can then withdraw the inventive device from the air conditioner, and the pressure reading remains on the gauge. In this way, the user can read the pressure in any convenient location or posture and need not be hunkered down under the hood of the car.

Further, once the user is finished, the user may press a button located on the neck of the socket. The button has a ramped portion which is contacted by and substantially perpendicular to an unseating pin. When the button is depressed, the unseating pin pushes the seal of the valve of the socket open to allow the gas trapped in the gauge to be released. Owing to the configuration of the invention, and the fact that it is hand-held and thus small, very little gas is trapped in the device. Still, when the seal is opened, the gas is released out of the device via the socket. Since the socket is facing the opposite side of the handle of the housing, it would be difficult and require great intentionality on the part of the user to spray himself with the small quantity of exiting gas.

Description will now be given of the invention with reference to the attached FIGS. 1–4. It should be noted that these figures are exemplary in nature and in no way serve to limit the scope of the invention, which is defined by the claims appearing hereinbelow.

Figure 1:
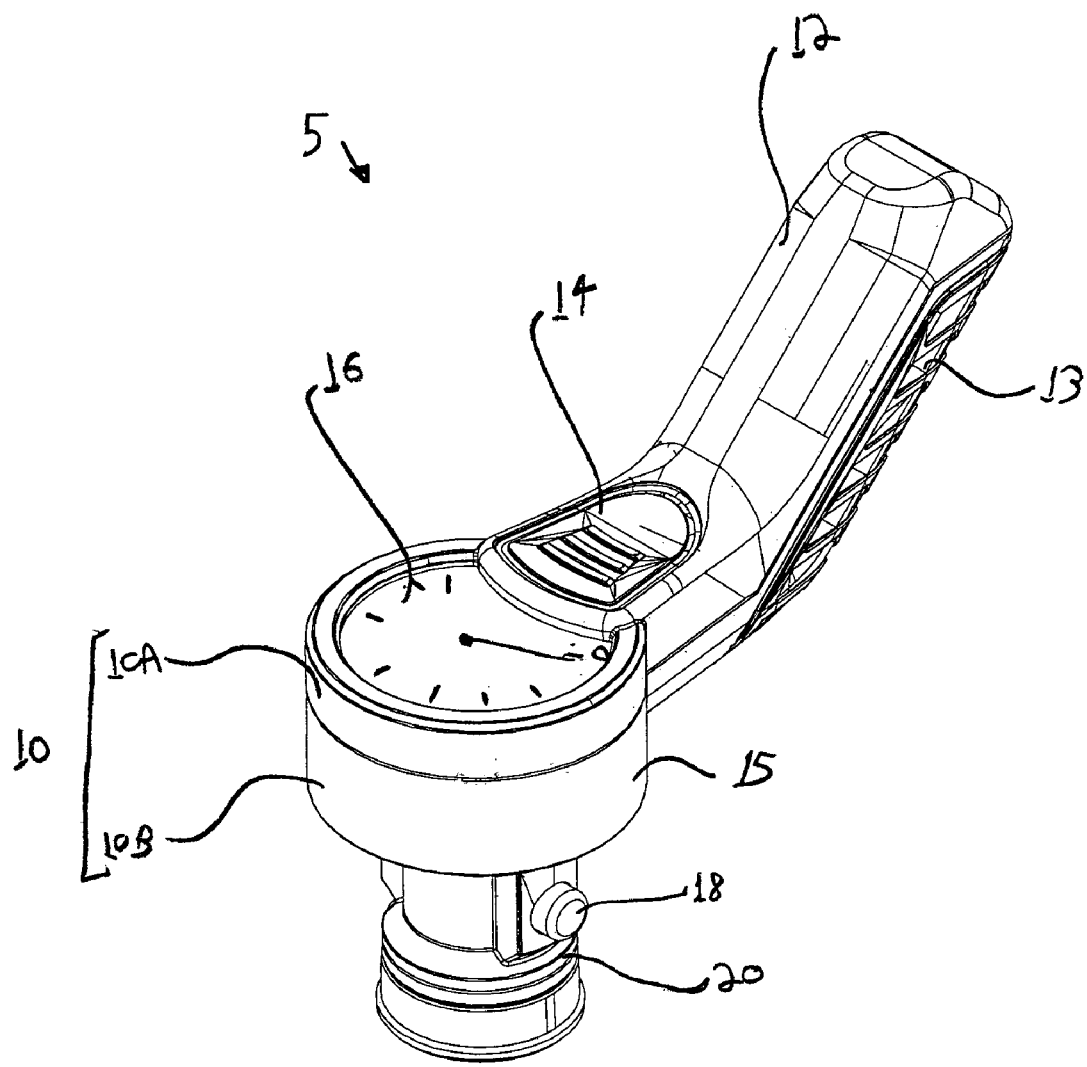
FIG. 1 is a top perspective view of a pressure measuring device in accordance with the invention.
Figure 2:
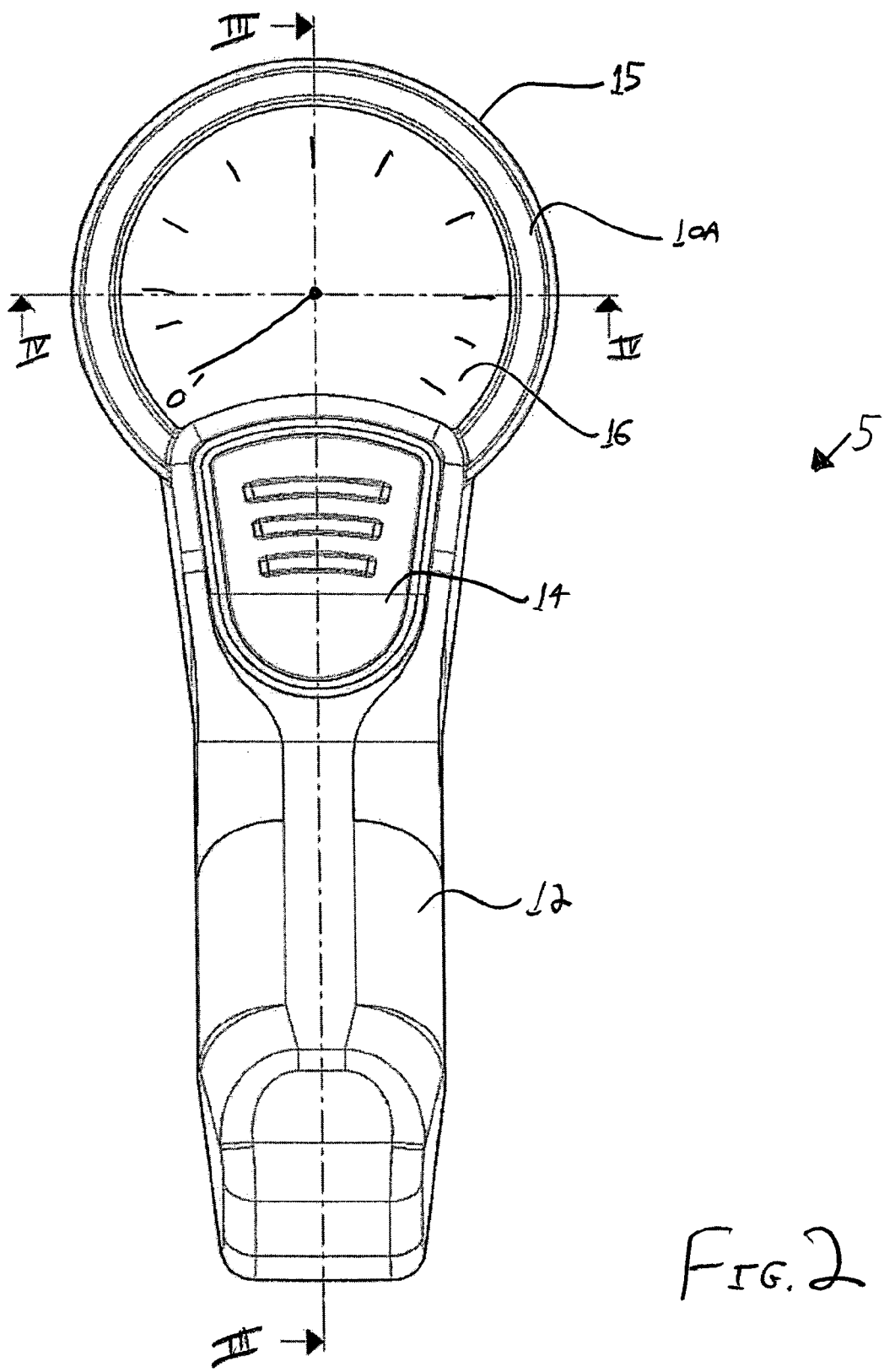
FIG. 2 is a top elevation view of the pressure measuring device of FIG. 1.

As shown generally in FIGS. 1 and 2, the inventive pressure measuring device 5 is designed to be hand-held in a comfortable manner for the user. Device 5 includes housing 10, which preferably includes top housing 10A and bottom housing 10B. The housing halves may be connected via press-fitting, sonic welding, or by a screw or screws 10C (see FIG. 3), or any conventional method. The proximal end of housing 10 is in the form of a handle 12 having a rubber grip 13 disposed on the bottom portion. Opposed to grip 13 on top housing 10A is thumb pad 14. In use, the user grasps handle 12, curling his fingers around grip 13 and placing his thumb on thumb pad 14. This position affords the user great comfort and leverage when using device 5.

Figure 3:
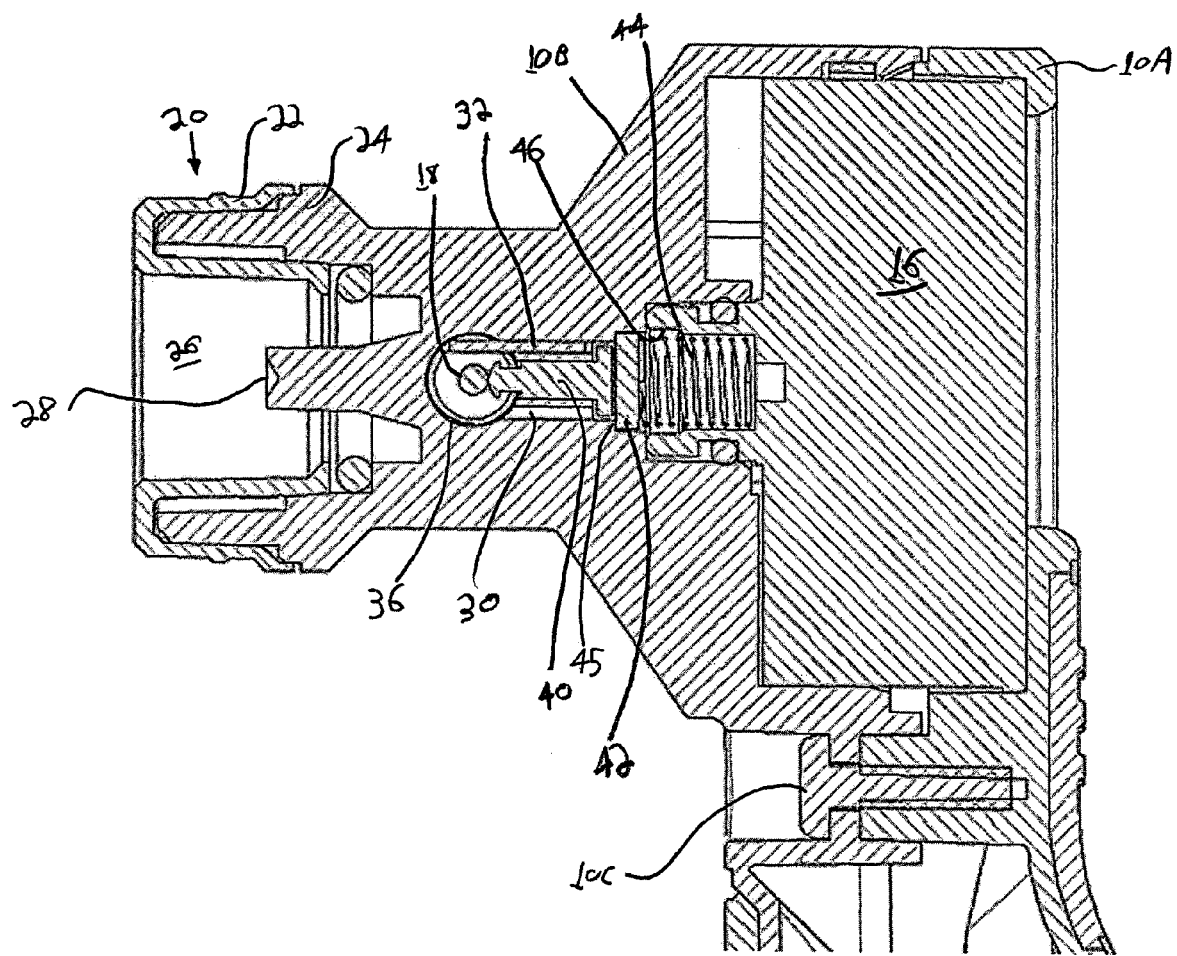
FIG. 3 is a sectional view of the pressure measuring device of FIG. 1 taken along line III—III of FIG. 2.

Housing 10 has at its distal end a well 15 in which the chief mechanical components of device 5 are disposed. Visible from top housing 10A is a pressure gauge 16 of the type typically found in pressure measuring devices. As shown in FIGS. 1 and 3, reset button 18 is provided in communication with gauge 16. When button 18 is depressed, any pressurized gas trapped in the gauge is released. The distal end of device 5 terminates in socket 20 which is adapted to engage or mate with a service port of an automobile air conditioner (preferably the low pressure service port). The user simply grasps device 5 as described above, presses socket 20 against the uncapped service port by exerting force on thumb pad 14, and a pressure reading can be taken.

Figure 4A:
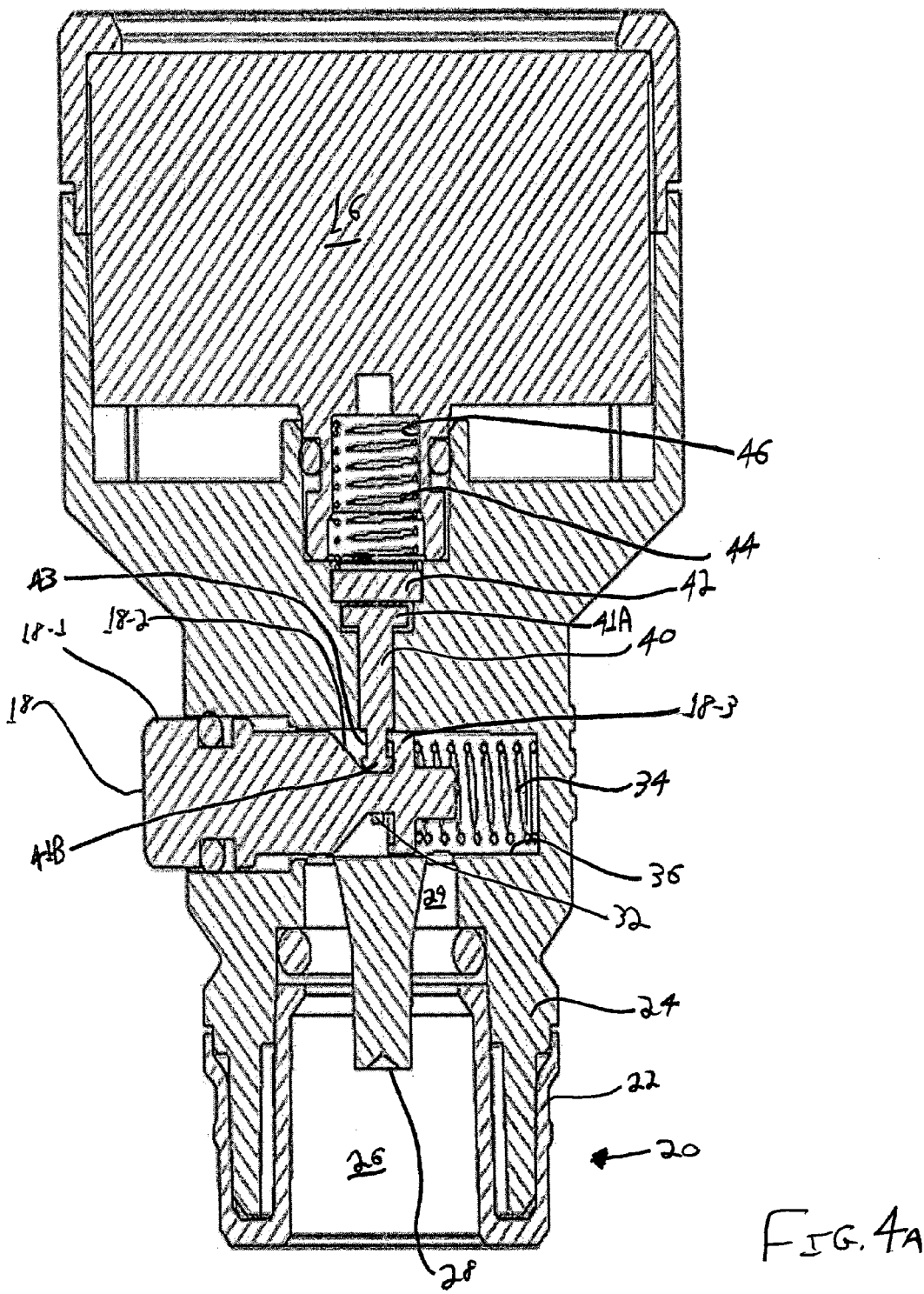
FIG. 4A is a sectional view of the pressure measuring device of FIG. 1 taken along line IV—IV of FIG. 2 when the pressure measuring device is taking a pressure reading.
Figure 4B:
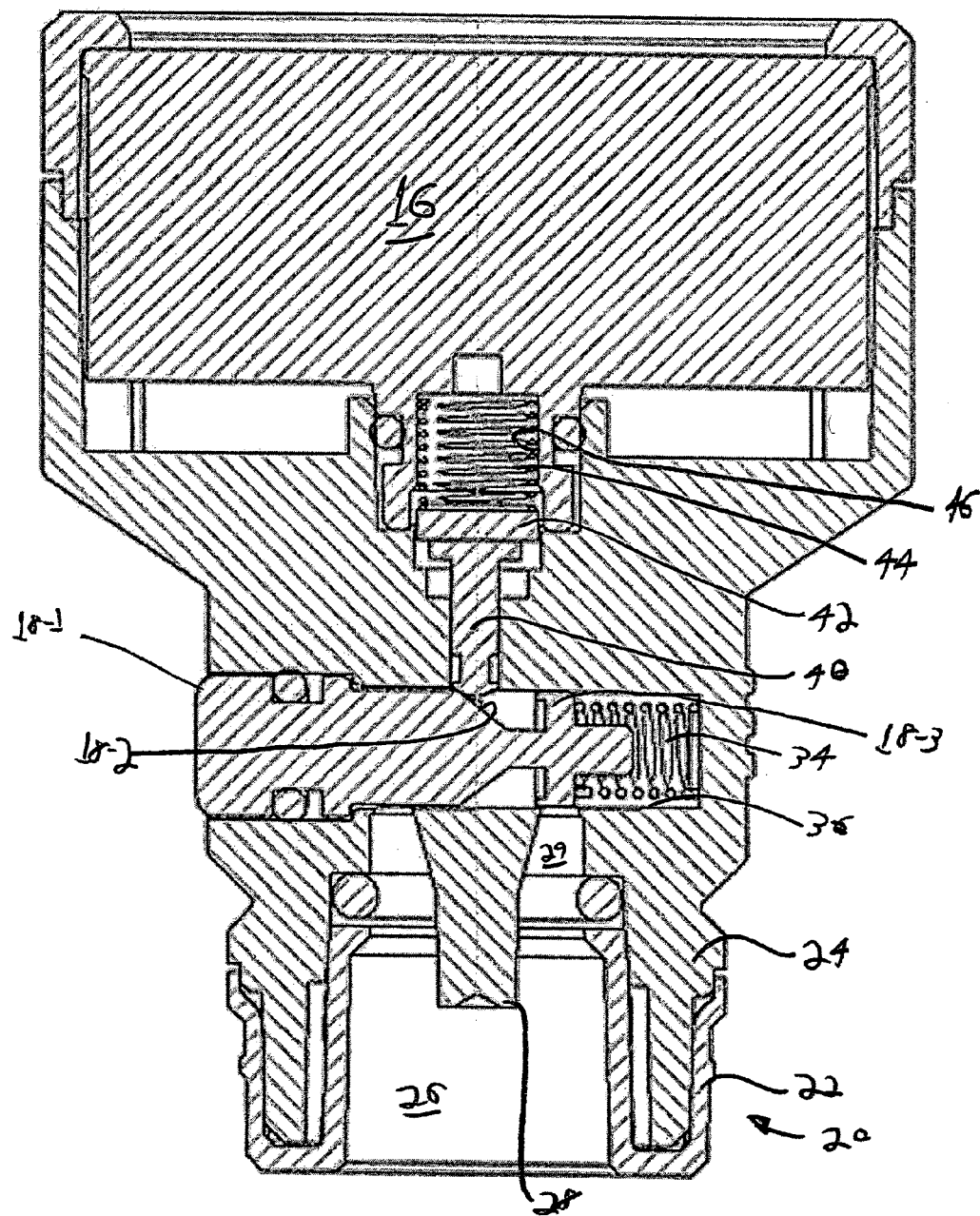
FIG. 4B is a sectional view of the pressure measuring device of FIG. 1 taken along line IV—IV of FIG. 2 when the pressure measuring device is being reset.
Figure 5B:
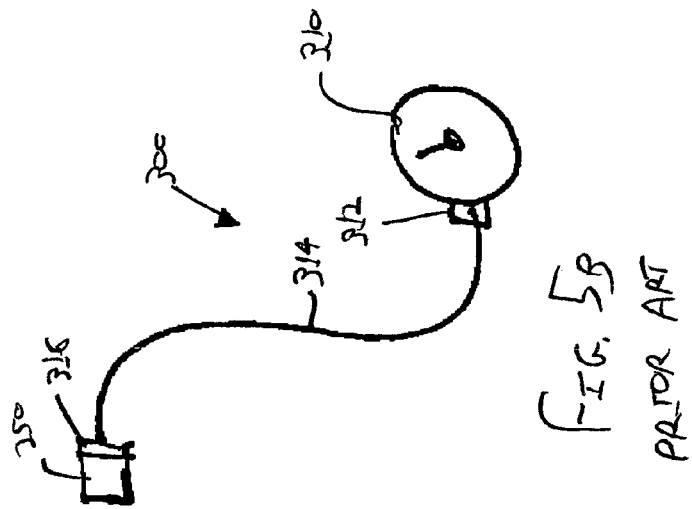
FIG. 5B is a schematic of a conventional hose and coupleable pressure gauge.
Figure 5A:
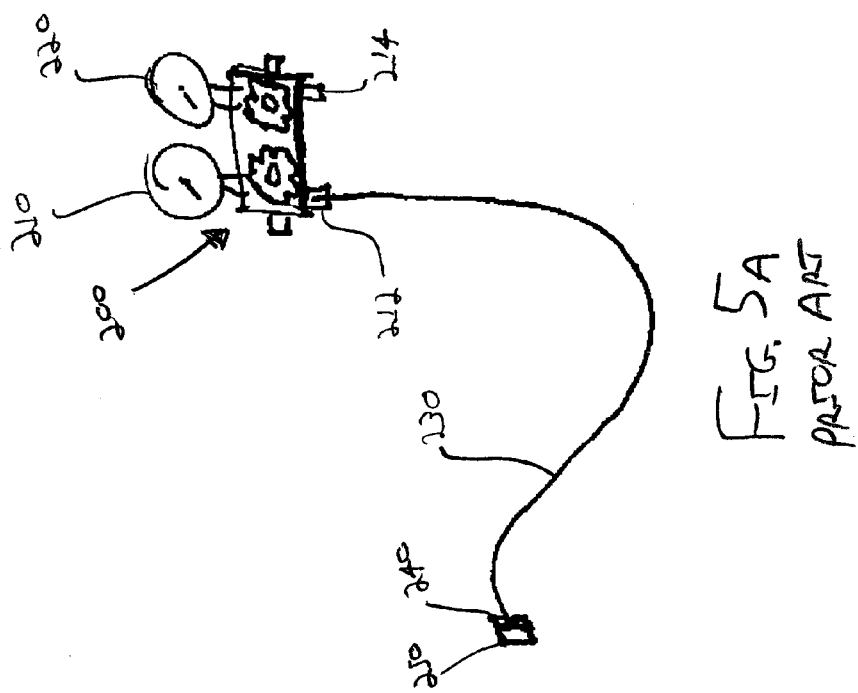
FIG. 5A is a schematic of a conventional manifold set for professionally measuring air conditioner pressure.

FIGS. 3 and 4 depict the distal end of device 5 in two orthogonal sectioned views. Socket 20 includes an outer ring 22 which is secured to rim 24 of bottom housing 10B. Socket 20 includes a recess 26 in which projection 28 is disposed. When socket 20 is pressed against a service port, projection 28 opens the valve of the service port to allow the pressurized gas in the system to exit.

Housing 10B includes a gas flow path linking socket 20 to pressure gauge 16. Gas entering recess 26 passes into chamber 29 (see FIG. 4) and into bore 36 in which button 18 is reciprocatably disposed. As best shown in FIG. 3, at least one passage 30 is provided in housing 10B to communicate bore 36 with pressure gauge 16. Two additional passages are preferably provided; one houses retaining pin 32 (see FIG. 3) which prevents button 18 from falling out of the housing (see below), and the other houses reset or seal unseating pin 40, which will be described below.

Turning to FIGS. 4A and B, button 18 includes a first end 18-1 which protrudes from housing 10B and a second end which includes flange 18-3. A biasing means, here coil spring 34, biases button 18 to protrude from housing 10B when not depressed. Spring 34 presses against flange 18-3 and an inner wall of bore 36. Retaining pin 32 contacts flange 18-3 to help prevent button 18 from being ejected from housing 10B by spring 34. A ramped portion 18-2 is formed in button 18 towards the second end of the button near flange 18-3. As shown in this example, the diameter of ramped portion 18-2 increases in the direction from flange 18-3 to protruding end 18-1.

Seal unseating pin 40 is provided in housing 10 with first end 41A nearly in contact with valve or seal 42 and second tapered end 41B in contact with ramped portion 18-2 of button 18. End 41B is provided with a notch 43 which engages a rim of flange 18-3 to prevent reset pin 40 from being pushed out of engagement with button 18 and potentially holding seal 42 open. Biasing means, in this case coil spring 44, biases seal 42 closed to interrupt the flow of gas out of pressure gauge 16; typical gas pressure in an air conditioning system is great enough to overcome the small biasing force of spring 44.

FIG. 4A depicts the device when it is ready to take a pressure reading. Socket 20 is engaged with a service port, and projection 28 opens the valve on the service port. Gas escaping from the service port enters recess 26, travels to chamber 29, flows past button 18 in bore 36, travels along passage 30, where it forces seal 42 open, enters bore 46, and causes pressure gauge 16 to be activated. Once this occurs, the back pressure of the gas trapped behind seal 42 (i.e., on the gauge side of the seal in bore 46) remains behind seal 42 since the seal is biased closed against seal seat 45 by both spring 44 and the gas pressure itself. Thus, the user can press the device onto the air conditioner service port under the hood, withdraw the device from the service port, and the device will retain the pressure reading for a significant period of time, thereby allowing the user to move the device into a safer or better lighted area so that the user can read the gauge with ease.

Once the user is finished with the pressure reading, he depresses button 18 by applying finger pressure to protruding end 18-1 against the bias of spring 34. The application of such pressure forces button 18 to move inward; consequently, a progressively wider diameter of ramped portion 18-2 is presented to pin 40, and pin 40 is pushed upwards against the bias of spring 44. By doing so, the user lifts seal 42 off of its seat 45 above passage 30, and gas trapped behind seal 42 is released. The only direction for the trapped gas to travel is back out the way it came, ultimately exiting device 5 from socket 20.

It is preferred that pin 40 be made so that its overall length is at least 2–3 times its widest diameter at end 41A to prevent the pin from cocking in its hole. Pin 40 is preferably made of brass or a similar non-reactive metal. Housing 10 is preferably made from a plastic material.

Having described the invention with reference to the drawings, it should be understood that the scope of the invention is not limited by the drawings but rather is defined by the claims appearing hereinbelow. Variations and modifications to the above description that would be obvious to one skilled in the art are contemplated as within the scope of the invention.

What is claimed is:

1. A portable device for measuring the pressure in an automobile air conditioning system, comprising:
    a hand-held housing, including:
        a socket adapted to connect to a service port of an automobile air conditioning system;
        an internal passage in communication with said socket;
    a pressure gauge disposed in said housing and selectively in communication with said internal passage; and
    a valve interposed between said internal passage and said gauge, said valve biased into a closed position sealing off said internal passage from said pressure gauge;
    wherein when said socket is engaged to a service port of an automobile air conditioning system, gas from the automobile air conditioning system enters said socket, passes through said valve, and is read by said pressure gauge.

2. A portable device for measuring the pressure in an automobile air conditioning system according to claim 1, further comprising reciprocatable means for opening said valve against said valve bias.

3. A portable device for measuring the pressure in an automobile air conditioning system according to claim 2, said reciprocatable means comprising:
    a button having a first end protruding from said hand-held housing and a second end having a ramped portion, said button biased to protrude from said hand-held housing;
    a pin having a first pin end in contact with said ramped portion of said button and a second pin end in contact with said valve;
    wherein when said button is depressed, said first end rides up said ramped portion and said second end raises said valve into an open position to allow pressurized gas trapped on a gauge side of said valve to be released via said socket to reset said gauge.

4. A portable device for measuring the pressure in an automobile air conditioning system according to claim 3, wherein said valve is biased via a first spring and said button is biased via a second spring.

5. A portable device for measuring the pressure in an automobile air conditioning system according to claim 3, said distal end of said button further comprising a rim, and said device further comprising a retainer engageable with said rim which retains said button within said housing and prevents said button from exiting said housing.

6. A portable device for measuring the pressure in an automobile air conditioning system according to claim 3, said second end of said pin having a greater diameter than said first end.

7. A portable device for measuring the pressure in an automobile air conditioning system according to claim 3, wherein the length of said pin is at least twice as long as said diameter of said second end.

8. A portable device for measuring the pressure in an automobile air conditioning system according to claim 1, wherein said socket comprises a projection centrally disposed in said socket, wherein when said socket is engaged with an automobile air conditioner service port, said projection opens a valve on the service port.

* * * * *